May 23, 1967   E. R. HUTCHINSON   3,321,180
VEHICLE-MOVING DEVICE HAVING FOUR-POSTER-TYPE
SCREW JACK LIFTING MEANS
Filed March 18, 1965   3 Sheets-Sheet 1

INVENTOR.
ELMER R. HUTCHINSON
BY
ATTORNEY

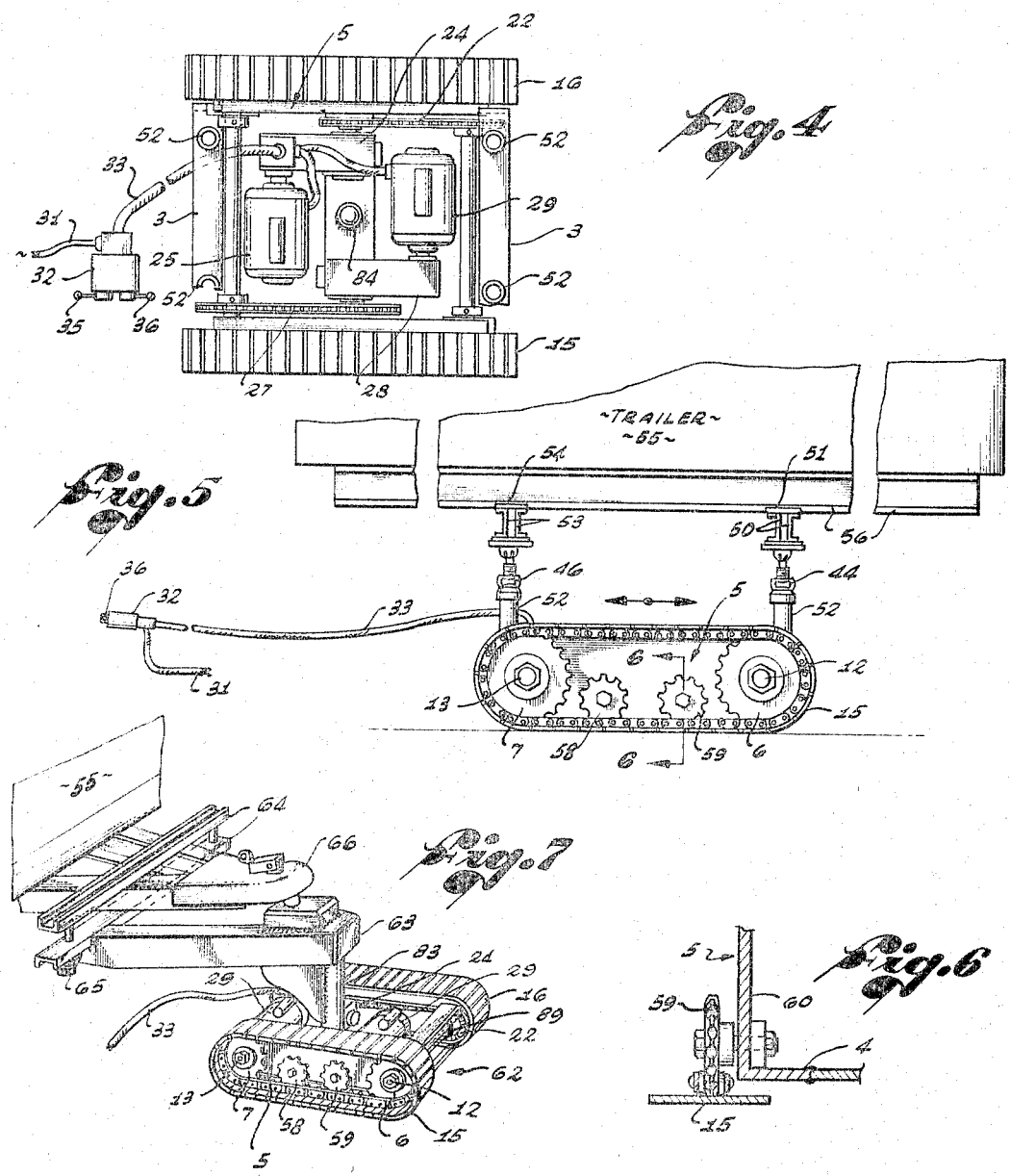

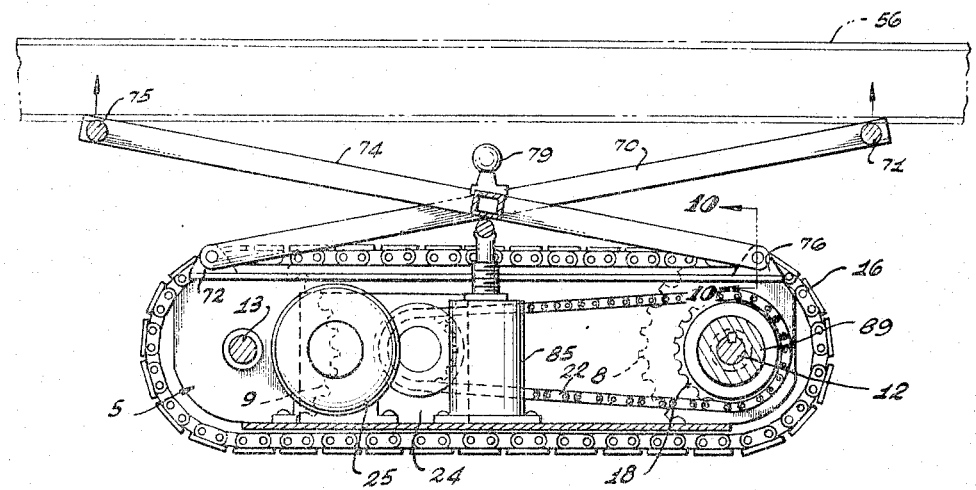
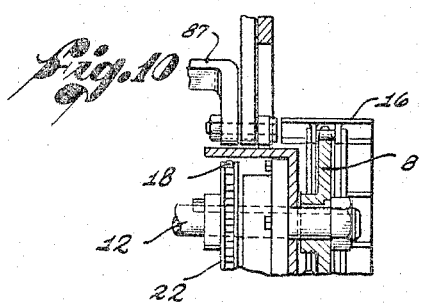
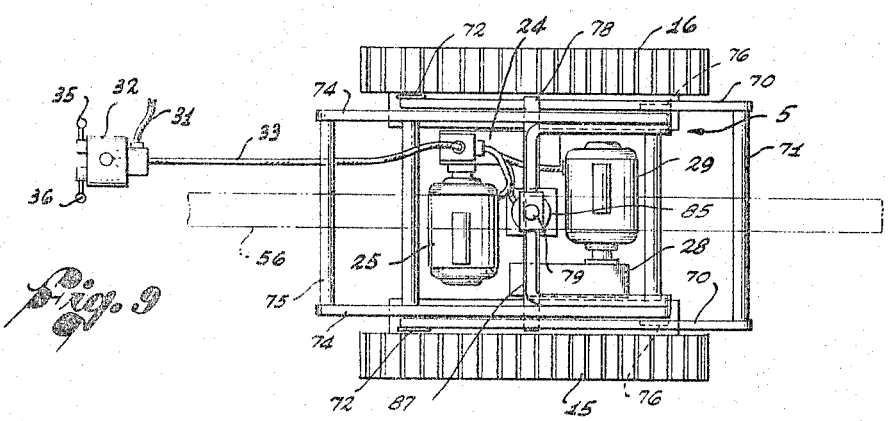

United States Patent Office 3,321,180
Patented May 23, 1967

3,321,180
VEHICLE-MOVING DEVICE HAVING FOUR-POSTER-TYPE SCREW JACK LIFTING MEANS
Elmer R. Hutchinson, 11616 Burbank Blvd.,
North Hollywood, Calif. 91601
Filed Mar. 18, 1965, Ser. No. 440,723
2 Claims. (Cl. 254—7)

This invention relates to dollies or vehicle-moving devices and particularly to power-driven dollies of the endless belt track or caterpillar type.

Dollies or devices for moving vehicles, particularly house trailers to which the dolly is connected to the front end of the trailer A-frame and generally adapted for moving small trailers, are known, one such dolly being disclosed and claimed in my copending application, Ser. No. 394,014, filed Sept. 2, 1964, now Patent No. 3,269,740. An endless belt type dolly, manually operated, is shown in Patent No. 2,786,690, of Mar. 26, 1957.

The present invention is a dolly or vehicle-moving device primarily adapted to be placed under the body of a trailer of the mobile home type having lengths of from 40 to 60 feet or more. By placing the dolly device under the body of the vehicle to be moved, it is suitable for moving large mobile homes transversely or in any particular direction to permit the placing of the mobile homes in their final positions where spaces are limited. That is, such mobile homes are usually transported by trucks to a position as close as possible to their positions where the mobile homes will be permanently situated. Applicant's dolly is then placed under the body of the trailer or mobile home and when connected to an electrical power source may move the trailer in any direction desired to place it in its final position. Not only is the dolly capable of moving the trailer body but it may also be attached to the pulling A-frame if such movement thereof is desired. Thus, one person may now position the largest of mobile homes in any particular location.

The principal object of the invention, therefore, is to facilitate the moving of vehicles such as heavy trailers or mobile homes in limited spaces.

Another object of the invention is to provide an improved trailer-moving device or dolly which can readily maneuver a heavy mobile home to its final position.

A further object of the invention is to provide a power-driven heavy duty dolly adapted to be readily placed under the body of a trailer for maneuvering the trailer within limited spaces.

A better understanding of this invention may be had from the following detailed description when read in conjunction with the accompanying drawings, in which:

FIG. 4 is a plan view of the invention taken along the line 4—4 of FIG. 2;

FIG. 5 is an elevational view showing a trailer positioned on the device;

FIG. 6 is a detailed view taken along the line 6—6 of FIG. 5;

FIG. 7 is a perspective view showing the attachment of the device to the front end of a trailer;

FIG. 8 is a modification of the trailer-elevating mechanism mounted on the device;

FIG. 9 is a plan view of the modification of the invention shown in FIG. 8; and

FIG. 10 is a cross-sectional view taken along the line 10—10 of FIG. 8.

Figure 1:
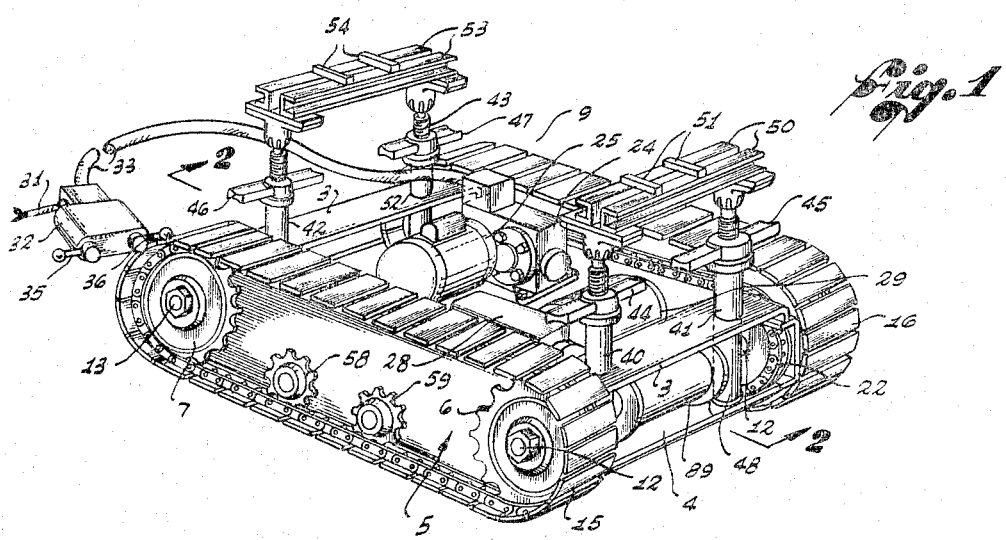
FIG. 1 is a perspective view of a heavy duty trailer-moving device embodying the invention.
Figure 2:
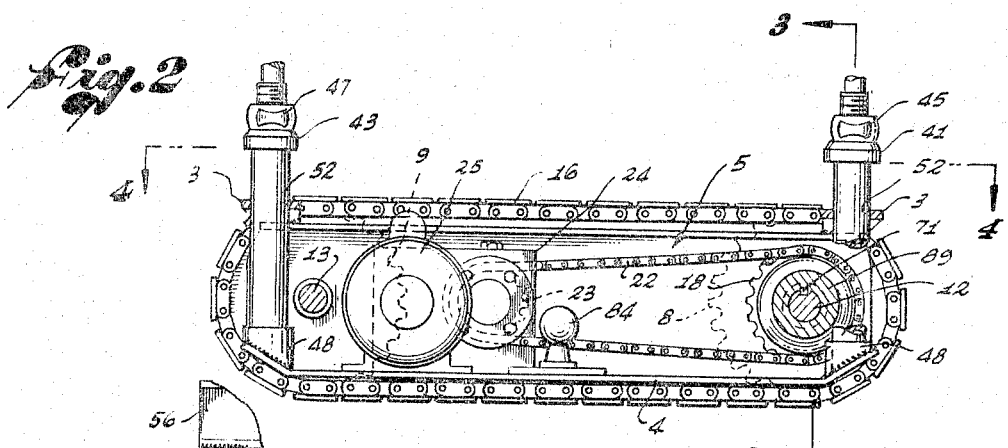
FIG. 2 is a cross-sectional view of the device shown in FIG. 1 and taken along the line 2—2 of FIG. 1.
Figure 3:
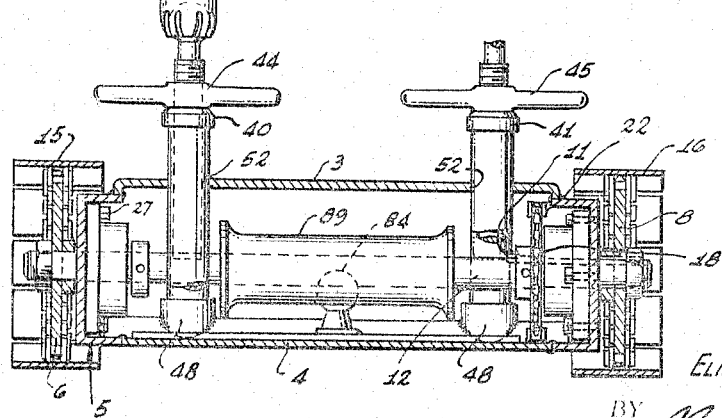
FIG. 3 is a cross-sectional view taken along the line 3—3 of FIG. 2.

Referring, now, to the drawings in which the same reference numerals identify the same elements, an endless belt track dolly has a rectangular frame 5 having a bottom frame plate 4 and upper cross plates 3. At the corners of the frame are mounted endless track sprockets 6, 7, 8, and 9, these sprockets being mounted on axles 12 and 13. Positioned around the sprockets 6 and 7 is an endless belt track 15, and around sprockets 8 and 9 is a continuous belt track 16. The sprocket 8 is keyed by key 11 to the shaft 12 along with a driving chain sprocket 18. In this manner, the two sprockets 8 and 18 are driven to drive the track belt 16. The other belt sprocket 9 is an idler and rotates freely on shaft 13.

A chain 22 around sprocket 18 is also around a sprocket 23 in a gear box 24 which is driven by a motor 25. A similar drive chain 27 is driven through a gear box 28 by a motor 29 to drive the endless belt 15 (see FIG. 4).

Power for the motors 25 and 29 is provided over a cable 31 through a control switch 32 and a cable 33 connected to the respective motors. By a handle 35, one of the motors may be energized in either direction while lever 36 controls the energization of the other motor in either direction. In this manner, the dolly may be rotated or driven in any desired direction under control of the handles 35 and 36 for placement of the dolly in proper position under the trailer.

Mounted in holes 52 in the cross plates 3 of the rectangular frame 5 are the lower standards of four screw jacks 40, 41, 42, and 43 which are manually actuated by respective handles 44, 45, 46, and 47. The bottom ends of the jacks rest in sockets 48 on the bottom plate 4. In this manner, jacks of different lengths may be exchanged to accommodate trailers of different heights. Mounted on the upper ends of screw jacks 40 and 41 in any suitable manner is a pair of channel iron beams 50 with positioning strips or cleats 51 welded thereto, and on jacks 42 and 43 is mounted a pair of channel iron beams 53 with their positioning strips 54. Between the positioning strips 51 and 54 is mounted a trailer-supporting member such as an I-beam 56 positioned under trailer 55. The I-beam 56 is normally positioned transversely of the trailer and when in proper position, the screw jacks 40, 41, 42, and 43 are actuated to bodily raise the trailer off its wheels or other supports (see FIG. 5).

To support the endless chain belts intermediate their sprockets, a pair of idlers 58 and 59 for track 15 are shown, these idlers being mounted on angle side members 60 welded to bottom member 4 as shown in FIG. 6. A similar pair of idlers are also provided for belt 16.

After the trailer has been mounted on the I-beam 56 and is supported by the dolly, the trailer may be moved transversely in either direction by energization of the motors 25 and 29 simultaneously, the front end of the trailer being on its caster wheel. If the I-beam is at an angle to the axis of the trailer, the trailer will be moved parallel with the axis of the I-beam. By the use of a similar dolly shown generally at 62 in FIG. 7, and which is provided with an A-frame connecting unit 63 which is attached to the A-frame by a pair of U-shaped clamps 64 tightened by bolts 65, and with the ball of the unit 63 positioned in the socket of the A-frame tip 66, the trailer may be moved longitudinally. In this instance, the trailer is on its travelling wheels. By varying the energization of the two motors, the direction of travel of the dolly may be varied since the post 83 has a socket within which is a ball 84 on the dolly frame. Thus, the unit 62 can move the trailer longitudinally or angularly, and with the unit under the body of the trailer, it can be moved transversely. In this manner, a heavy trailer, such as a large mobile home, may be maneuvered by one person into any desired position within a limited space.

Referring, now, to FIGS. 8, 9, and 10, instead of using four manually actuated jacks at the four corners of the dolly, a scissors mechanism hydraulically or electrically actuated, as shown in these figures, may be used. This modification has a pair of parallel arms 70 interconnected by a rod 71 and hinged on ears 72 attached to the frame 5 of the dolly, and a second pair of parallel arms 74, two ends of which are interconnected by a bar 75, the other ends thereof being pivoted on ears 76 attached to the frame 5.

In FIG. 9, motors 25 and 29 and gear boxes 24 and 28 are shown, this dolly being of the same type as described above. Mounted under the central portion of the arms 70 and 74 is a rod 78, under which is an electrically actuated jack 85 which will raise the free ends of the arms 70 and 74. By placing I-beam 56 on rods 71 and 75 and the I-beam against the bottom of the trailer, the trailer can be raised and moved as described above. An hydraulically operated jack may be used instead of the electrical jack. The jack could also be operated manually.

A U-shaped frame member 87 having a rectangular cross section and pivoted on ears 76 has mounted at the center of its cross portion a ball 79. The socket in the tip 66 (see FIG. 7) of the A-frame can be mounted on ball 79 for moving the trailer as described in connection with FIG. 7, the ball being in its correct position when connected to the trailer.

When a lack of traction is encountered, a cable drum on shaft 12, such as illustrated at 89, and driven by one of the motors may be used with a cable similarly to the "dead man" arrangement shown in my above-mentioned patent application.

I claim:
1. A self propelled device for supporting and moving a vehicle, which includes:
   a generally rectangular frame;
   an endless belt track on each side of said frame;
   means supporting said belt tracks for independent movement along said sides of said frame;
   separate motor means driving each of said belt tracks;
   controller means for independently controlling the operation of said motor means, remotely located with respect to said frame and connected thereto by flexible means;
   a plurality of screw type jacks located adjacent the corners of said frame, said jacks being supported by said frame and being vertically extensible and retractible;
   interconnecting means extending transversely between the upper ends of each end pair of said jacks and movable therewith;
   positioning strips centrally located at the top of said interconnecting means;
   and a beam-type member carried by said interconnecting means between said positioning strips and movable therewith, said member extending beyond the boundaries of said frame to engage widely separated points on said vehicle, whereby the extension of said jacks raises said member for engagement and lifting of said vehicle, and the operation of said motor means thereafter causes the horizontal movement of said vehicle.

2. A device as defined in claim 1 in which the height of said load supporting means, when said extensible means are retracted, is such as to permit said device to be maneuvered beneath said vehicle, and when said extensible means are extended, lifts the wheels of said vehicle off the ground.

References Cited by the Examiner

UNITED STATES PATENTS

| | | | |
|---|---|---|---|
| 394,439 | 12/1888 | Beckert | 254—7 XR |
| 968,315 | 8/1910 | Beckert | 254—7 |
| 1,855,839 | 4/1932 | Lange | 180—9.46 |
| 1,927,598 | 9/1933 | Schlichter | 254—7 |
| 1,963,022 | 6/1934 | Kettelson | 254—7 XR |
| 2,605,852 | 8/1952 | Rhoads | 180—6.7 |
| 2,650,099 | 8/1953 | Keaton | 280—414 |
| 2,832,481 | 4/1958 | Stevens et al. | 254—2 XR |
| 2,846,018 | 8/1958 | Puckett | 180—6.2 |
| 2,904,308 | 9/1959 | Vergara | 254—8 |
| 2,966,253 | 12/1960 | Lambert | 180—14 |
| 3,049,253 | 8/1962 | Cabral | 180—14 XR |

FOREIGN PATENTS 84,855  1/1955  Norway.

WILLIAM FELDMAN, *Primary Examiner.*
MILTON S. MEHR, *Examiner.*